(12) United States Patent
Luo et al.

(10) Patent No.: US 11,795,771 B2
(45) Date of Patent: Oct. 24, 2023

(54) REAL-TIME INFLUX MANAGEMENT ENVELOPE TOOL WITH A MULTI-PHASE MODEL AND MACHINE LEARNING

(71) Applicant: Halliburton Energy Services, Inc., Houston, TX (US)

(72) Inventors: Yan Luo, Carrollton, TX (US); Adan H. Herrera, Carrollton, TX (US); Muran Han, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 63 days.

(21) Appl. No.: 17/550,774

(22) Filed: Dec. 14, 2021

(65) Prior Publication Data

US 2023/0184044 A1 Jun. 15, 2023

(51) Int. Cl.
*E21B 21/08* (2006.01)
*G05B 13/02* (2006.01)
*E21B 21/10* (2006.01)

(52) U.S. Cl.
CPC .......... *E21B 21/08* (2013.01); *G05B 13/0265* (2013.01); *E21B 21/106* (2013.01); *E21B 2200/20* (2020.05); *E21B 2200/22* (2020.05)

(58) Field of Classification Search
CPC ................................ E21B 21/08; E21B 21/003
See application file for complete search history.

(56) References Cited

U.S. PATENT DOCUMENTS

| | | | |
|---|---|---|---|
| 5,952,569 A * | 9/1999 | Jervis | E21B 47/10 73/152.01 |
| 8,256,532 B2 | 9/2012 | Gray | |
| 9,279,298 B2 * | 3/2016 | Lewis | E21B 44/005 |
| 9,970,266 B2 | 5/2018 | Marx et al. | |
| 10,138,693 B2 * | 11/2018 | Leuchtenberg | E21B 21/106 |
| 10,443,328 B2 * | 10/2019 | Culen | E21B 21/08 |
| 2008/0097735 A1 | 4/2008 | Ibrahim et al. | |
| 2016/0237810 A1 * | 8/2016 | Beaman, Jr. | E21B 41/00 |
| 2017/0356259 A1 | 12/2017 | Culen | |
| 2018/0187498 A1 | 7/2018 | Sanchez Soto et al. | |
| 2021/0017847 A1 | 1/2021 | Aragall et al. | |

(Continued)

FOREIGN PATENT DOCUMENTS

| | | |
|---|---|---|
| WO | 2016040310 A1 | 3/2016 |
| WO | 2019132864 A1 | 7/2019 |

OTHER PUBLICATIONS

Carpenter, Chris, "Developing an Influx-Management Envelope for a Deepwater MPD Operation," Journal of Petroleum Technology, May 2018, 3 pages, Society of Petroleum Engineers.

(Continued)

*Primary Examiner* — Kenneth L Thompson
(74) *Attorney, Agent, or Firm* — Conley Rose, P.C.; Rodney B. Carroll

(57) ABSTRACT

A method of managing an influx encountered during a drilling operation conducted with respect to a wellbore includes drilling a wellbore into a subterranean formation. Drilling the wellbore includes circulating a drilling fluid through a wellbore while operating a drill bit and monitoring one or more parameters associated with the drilling operation for indicia of the influx within the wellbore. The method also includes, upon detecting the indicia of the influx, determining, via an influx management model, an initial influx volume.

32 Claims, 4 Drawing Sheets

(56) References Cited

U.S. PATENT DOCUMENTS

2021/0079752 A1   3/2021   Van Camp
2021/0140299 A1   5/2021   Dahl et al.

OTHER PUBLICATIONS

Culen, M.S. et al., "Evolution of the MPD Operations Matrix; The Influx Management Envelope," SPE/IADC Managed Pressure Drilling and Underbalanced Operations Conference and Exhibition, Apr. 12-13, 2016, 18 pages, Society of Petroleum Engineers.

Berg, Christian et al., "The Influx-Management Envelope Considering Real-Fluid Behavior," SPE Drilling and Completion, Jun. 2020, pp. 136-150, Society of Petroleum Engineers.

Fjetland, Andreas K. et al., "Kick Detection and Influx Size Estimation during Offshore Drilling Operations using Deep Learning," 2019, 6 pages.

Shi, Xiaoyan et al., "A New Method to Detect Influx and Loss During Drilling Based on Machine Learning," International Petroleum Technology Conference, 2019, 12 pages.

Foreign Communication from Related Application—International Search Report and Written Opinion of the International Searching Authority, International Application No. PCT/US2021/064506, dated Sep. 1, 2022, 10 pages.

* cited by examiner

REAL-TIME INFLUX MANAGEMENT ENVELOPE TOOL WITH A MULTI-PHASE MODEL AND MACHINE LEARNING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores are sometimes drilled into subterranean formations that contain hydrocarbons to allow recovery of the hydrocarbons. Formation fluids can enter the wellbore during a drilling operation, referred to as "influxes" or "fluid influxes." To prevent influxes, a managed pressure drilling (MPD) system provides a closed-loop circulation in which bottomhole pressure is balanced and managed by controlling a choke at surface. Unexpected influxes can be problematic, particularly, in that influxes encountered in a drilling operation may expose equipment to conditions exceeding the limitations of that equipment (for example, pressures exceeding MPD system pressure limitations). As such, when an influx is encountered during a drilling operation, it is necessary to characterize the volume and intensity of the influx in order to appreciate whether or not it will cause operational limits of various wellbore equipment to be exceeded.

The influx management envelope tool has been utilized to determine the maximum allowable influx. However, current influx management envelope tools are mostly based on a "single-bubble" approach, and fail to account for gas dissolution in the mud system as well as influx dispersion during circulation and, as such, are often inaccurate. As such, improvements in the characterization of an influx and/or the determination of the effect of an influx encountered in the course of a drilling operation may be beneficial in the context of a drilling operation.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Figure 1:
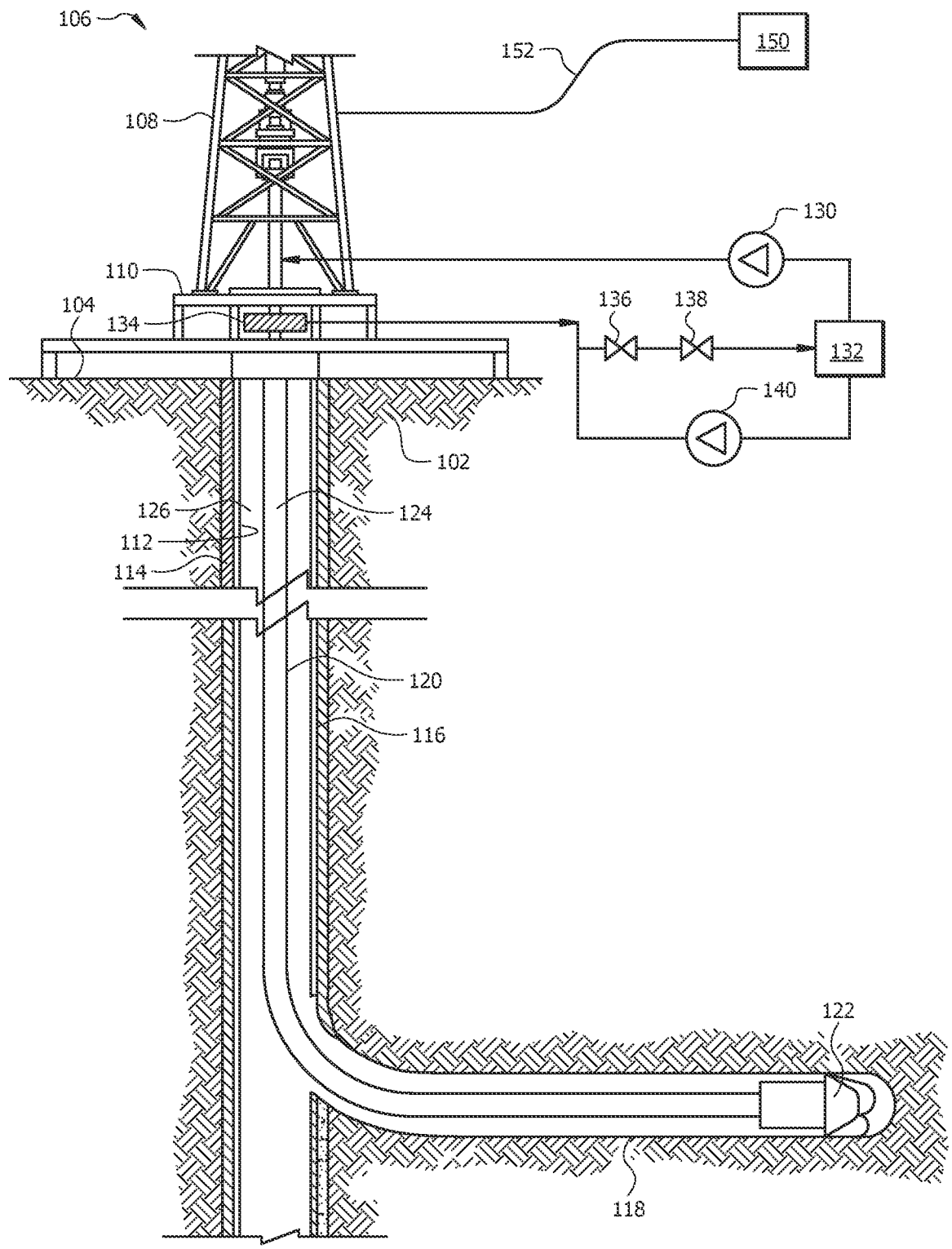
FIG. 1 is a cut-away view of an embodiment of a wellbore servicing system according to an embodiment.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ." Reference to up or down will be made for purposes of description with "up," "upper," or "upward" meaning toward the surface of the wellbore and with "down," "lower," or "downward" meaning toward the terminal end of the well, regardless of the wellbore orientation. References to "in" or "out" will be made for purposes of description with "in," "inner," or "inward" meaning toward the center of the wellbore in a radial direction (i.e., towards the central axis of the wellbore and/or the limit collar) and with "out," "outer," or "outward" meaning towards the wall of the well in a radial direction, regardless of the wellbore orientation. As used herein, a "servicing fluid" may refer to a fluid used to drill, complete, work over, fracture, repair, abandon, and/or in any way treat a wellbore penetrating a portion of a subterranean formation. Examples of servicing fluids include, but are not limited to, drilling fluids or muds, spacer fluids, fracturing fluids, completion fluids, remedial fluids, workover fluids, and/or treatment pills. The various characteristics mentioned above, as well as other features and characteristics described in more detail below, will be readily apparent to those skilled in the art with the aid of this disclosure upon reading the following detailed description of the embodiments, and by referring to the accompanying drawings.

Disclosed herein systems and/or methods for generating an influx management envelope while drilling a wellbore. In some embodiments, the disclosed systems and/or methods may implement an influx management model to provide an influx management envelope (IME) tool, which may be utilized by personnel to make operational decisions with respect to an influx encountered during a wellbore drilling operation, for example, a managed pressure drilling (MPD) operation. In some embodiments, the influx management model may be developed via machine learning using, for example, based upon simulated wellbore data, which may be developed using a suitable model, such as a multi-phase flow model.

As will be disclosed herein, the disclosed influx management model may yield improved accuracy in comparison to "single bubble" influx management approaches that fail to account for gas dissolution in the drilling fluid. Also, the disclosed influx management model may allow for provision of an IME tool in "real-time" or substantially in real-time, in comparison to multi-phase approaches that utilize iterative processes to establish relationships between influx volume and intensity. As used herein, "real-time" refers to a computation, determination, information transfer, or provision of an output occurring substantially contemporaneously with an input (e.g., information or data) upon which the computation, determination, information transfer, or provision of the output is based. For example, a real-time computation, determination, information transfer, or provision of an output may occur within about 5 seconds, or within about 4 seconds, or within about 3 seconds, or within about 2 seconds, or within about 1 second, or within fractions of a second.

In some embodiments, the disclosed influx management model may be implemented to manage an influx encountered during a drilling operation, for example, a managed pressure drilling (MPD) operation, such as by adjusting various operating parameters, adjusting the fluid composition of a drilling fluid or component thereof, identify potential operational issues such as potential safety concerns before they happen, and/or addressing one or more operational issues.

Referring to FIG. 1, an example of a wellbore drilling operation 100 in a wellbore environment is shown. As depicted, the wellbore drilling operation includes 100 a drilling rig 106 disposed on the earth's surface 104 and extends over and around a wellbore 114 that penetrates a subterranean formation 102, for example, for the purpose of recovering hydrocarbons. The drilling rig 106 comprises a derrick 108 with a rig floor 110 through which the drill string 120 extends downward from the drilling rig 106 into a wellbore 114. In an embodiment, the drill string 120 comprises a drill collar and is disposed within the wellbore 114. A drill bit 122 is located at the lower end of the drill string 120 and carves the wellbore 114 through the subterranean formation 102. The drill bit 122 may be one or more bits. The drilling rig 106 comprises a motor driven winch and other associated equipment for extending the drill string 120 into the wellbore 114 to position the drill string 120 for drilling the wellbore 114. While the operating environment depicted in FIG. 1 refers to a stationary drilling rig 106 for lowering and setting the drill string 120 within a land-based wellbore 114, in alternative embodiments, mobile workover rigs, wellbore servicing units (such as coiled tubing units), and the like may be used to lower the drill string 120 into a wellbore. It should be understood that a drill string 120 may alternatively be used in other operational environments, such as within an offshore wellbore operational environment.

In the embodiment shown in FIG. 1, one or more casing strings may be set within the wellbore 114, for example, using the drilling rig 106, to thereby form one or more cased sections of the wellbore 114. For example, the casing string may be conveyed into the subterranean formation 102 in a conventional manner (e.g., using the same motor driven winch and other associated equipment used to extend the drill string 120 into the wellbore 114) and may subsequently be secured within the wellbore 114 by filling an annulus or annular space 126 between the casing string and the wellbore 114 with cement. Subsequent stages or portions of the wellbore 114 may then be drilled by passing the drill string 120 through the cased section of the wellbore 114. In various embodiments, a vertical, deviated, or horizontal wellbore portion may be drilled, cased, and cemented and/or portions of the wellbore may be left uncased. For example, uncased and drilled section may comprise a portion of the wellbore 114 ready for being cased with a wellbore tubular and/or ready for production.

The wellbore 114 may be drilled into the subterranean formation 102 using any suitable drilling technique. The resulting wellbore 114 extends substantially vertically away from the earth's surface 104 over a vertical wellbore portion 116, deviates from vertical relative to the earth's surface 104 over a deviated wellbore portion, and transitions to a horizontal wellbore portion 118. In alternative operating environments, all or portions of a wellbore may be vertical, deviated at any suitable angle, horizontal, and/or curved. The wellbore or portion of the wellbore being serviced, for example, drilled, may be a new wellbore, added to an existing wellbore, a straight wellbore, an extended reach wellbore, a sidetracked wellbore, a multi-lateral wellbore, and other types of wellbores for drilling and completing one or more production zones. Further the wellbore may be used for any suitable purpose, such as a production well or an injection well.

In the embodiment of FIG. 1, the wellbore drilling operation is illustrated as a managed pressure drilling (MPD)) operation. For example, in the embodiment of FIG. 1, the drilling rig 106 generally comprises a pumping system generally configured to deliver a drilling fluid into the wellbore 114 during the drilling operation. As used herein, the "drilling fluid" may also be referred to as a "drilling mud." In various embodiments, the drilling fluid generally includes a base fluid and one or more additives.

In some embodiments, the base fluid includes an aqueous fluid. The aqueous fluid may be from any suitable source, examples of which include, but are not limited to, sea water, tap water, freshwater, water that is potable or non-potable, untreated water, partially treated water, treated water, produced water, city water, well-water, surface water, liquids including water-miscible organic compounds, or combinations thereof. In some embodiments, the aqueous fluid includes one or more salts, for example, a brine. The aqueous brine may be naturally occurring or artificially-created. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In one or more particular embodiments, salt includes NaCl, KCl, NaBr, $CaCl_2$, $CaBr_2$, $MgCl_2$, $MgBr_2$, $ZnBr_2$, acetate salts, sodium acetate, potassium acetate, ammonium chloride ($NH_4Cl$), potassium phosphate, sodium formate, potassium formate, cesium formate, or combinations thereof.

Additionally or alternatively, in some embodiments that base fluid includes an oil-based or oleaginous fluid. Examples of oleaginous fluids include, but are not limited to, petroleum oils, natural oils, synthetically-derived oils, oxygenated fluids, or combinations thereof. In one or more particular embodiments, the oleaginous fluid is selected from diesel oil, kerosene oil, mineral oil, synthetic oils, aliphatic hydrocarbons, polyolefins (e.g., alpha olefins, linear alpha olefins and/or internal olefins), paraffins, silicone-based fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof.

Examples of additives may include, but are not limited to, emulsifiers, viscosifiers, emulsion destabilizers, antifreeze agents, biocides, algaecides, pH control additives, oxygen scavengers, clay stabilizers, weighting agents, degradable fluid loss agents, foaming agents, foaming fluids (e.g., gases), and the like or any other additive that does not adversely affect the drilling servicing fluid.

In the embodiment of FIG. 1, a rig pump 130 (or a plurality of pumps) pumps the drilling fluid from a drilling fluid system 132 at the surface 104, via one or more fluid supply lines, to an axial flowbore 124 that extends the length of the drill string 120. The drilling fluid is pumped from the surface, down an axial flowbore 124 within the drill string 120, out of the drill bit 122, and into an annular space 126 between the drill string 120 and the sidewalls of the wellbore 114, for example, which may be defined by the casing string 112 and/or the subterranean formation 102. The drilling fluid is, in this manner, forced down the drill string 120, exits into the borehole through the drill bit 122, and is returns toward the surface via a return path comprising the annular space 126. The drilling fluid may be effective for cooling and lubricating the drill bit 122. The cuttings produced by the drill bit 122 cutting the subterranean formation 102 may be carried with the returned drilling fluid.

A rotating control device (RCD) 134 may be fluidly connected from the annular space 126 at the surface 104 for collecting the drilling fluid flow from the wellbore 114 while controlling the pressure of the drilling fluid within the wellbore 114. The returned drilling fluid may be communicated to the drilling fluid system 132 via a drilling fluid choke 136, which may be operated to manipulate the pressure of the drilling fluid within the wellbore 114, and a flow-meter 138, such as a Coriolis meter which may be used to determine the volume of the drilling fluid returned from the wellbore 114. The MPD system may also include a back-pressure pump 140, which may be used to further manipulate the pressure of the drilling fluid within the wellbore 114, such as by providing an additional volume of fluid into the wellbore 114 to increase the pressure of the drilling fluid within the wellbore 114. The drilling fluid system 132 include various components and/or apparatuses for preparing and/or recycling the drilling fluid being used. For example, the drilling fluid system 132 may comprise out gassing units and circulation tanks for maintaining a preselected mud viscosity and consistency. The cuttings carried by the drilling fluid may be removed via various components such as a shaker designed to allow the drilling fluid to pass through while retaining the cuttings for disposal, or within a settling reservoir. Additionally, the drilling rig 106 (for example, the MPD system) may further comprise a suitable number and arrangement of various apparatuses and devices (e.g., gauges, monitors, etc.) generally configured to monitor one or more parameters associated with the drilling operation, for example, various pressures, flow-rates, and the like.

In the embodiment of FIG. 1, various components of the drilling rig 106, for example, various components of the MPD system, can be communicably coupled with a computing system 150 that, as will be disclosed herein, includes and/or communicates with an influx management model operable to provide an IME tool, which may be utilized by personnel to make operational decisions with respect to an influx encountered during a wellbore drilling operation. For example, components of the drilling rig 106 such as the rig pump 130, the drilling fluid system 132, the drilling fluid choke 136, the flow-meter 138, and the back-pressure pump 140 may include various sensors (e.g., temperature, pressure, flow, position, and other sensors) effective to detect information as to the operation of the respective components and/or a parameter of the MPD operation (e.g., the pressure of the drilling fluid as detected by a particular component). Additionally or alternatively, one or more components of the drilling rig 106 such as the rig pump 130, the drilling fluid system 132, the drilling fluid choke 136, the flow-meter 138, and the back-pressure pump 140 may be configured to be operated (e.g., actuated or manipulated) in response to a signal received from the computing system 150.

The components of the drilling rig 106, as well as any other sensors, can be coupled to the computing system 150 via one or more communication links 152. Additionally, various components of the computing system 150 may likewise by communicatively coupled via one or more communication links 152. Generally, the communication links 152 may be any wired or wireless communication protocol and equipment operable to transfer data (e.g., measured information, instructions, and other data), either in real-time, near real-time (e.g., at or near real-time and accounting for some processing time but with no human-appreciable delays that are due to computer processing limitations), or at a delayed time (e.g., accounting for human user interaction, stored in a memory and analyzed at a remote time and/or location, etc.). For example, in some embodiments, the communication links 152 may facilitate transfer of data between the computing system 150 (or other computing system or controller communicably coupled to the computing system 150) and the various components of the drilling rig 106 during the drilling operation. Alternatively, data may be transferred before or after completion of such operations. In any event, the present disclosure contemplates that data is transferred within an appropriate time frame commensurate with the operations or processes being performed with the drilling rig 106.

Figure 2:
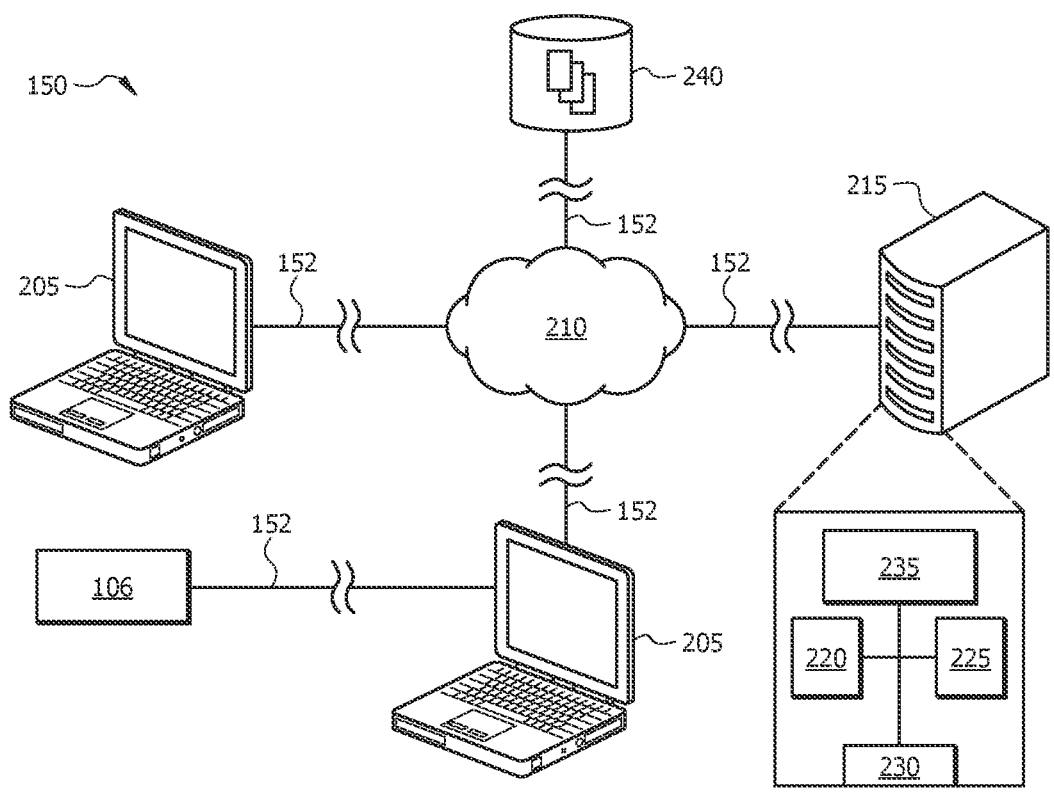
FIG. 2 is a schematic view of an embodiment of the computing system as may be utilized in the context of FIG. 1.

Referring to FIG. 2, an embodiment of the computing system 150 is illustrated. The computing system 150 can include a number of clients 205, a server system 215, and a data repository 240 communicably coupled through a network 210 by one or more communication links 152 (e.g., wireless, wired, or a combination thereof). The computing system 150, generally, can execute applications and analyzes data before, during, and/or after one or more drilling operations performed by the drilling rig 106. For instance, the computing system 150 may execute an influx management model 235 to provide an IME tool, which may be utilized by personnel to make operational decisions with respect to an influx encountered during a wellbore drilling operation.

In general, the server system 215 can be any server that stores one or more hosted applications, such as, for example, the influx management model 235. In some instances, the influx management model 235 may be executed via requests and responses sent to users or clients within and communicably coupled to the illustrated computing system 150 of FIG. 1 and FIG. 2. In some instances, the server system 215 may store a plurality of various hosted applications, while in other instances, the server system 215 may be a dedicated server meant to store and execute only a single hosted application, such as the influx management model 235.

In some instances, the server system 215 may comprise a web server, where the hosted applications represent one or more web-based applications accessed and executed via network 210 by the clients 205 of the system to perform the programmed tasks or operations of the hosted application. At a high level, the server system 215 can comprise an electronic computing device operable to receive, transmit, process, store, or manage data and information associated with the computing system 150. Specifically, the server system 215 illustrated in FIG. 2 can be responsible for receiving application requests from one or more client applications associated with the clients 205 of computing system 150 and responding to the received requests by processing said requests in the associated hosted application and sending the appropriate response from the hosted application back to the requesting client application.

In addition to requests from the clients 205 illustrated in FIG. 2, requests associated with the hosted applications may also be sent from internal users, external or third-party customers, other automated applications, as well as any other appropriate entities, individuals, systems, or computers. As used in the present disclosure and as described in more detail herein, the term "computer" is intended to encompass any suitable processing device. For example, although FIG. 2 illustrates a single server system 215, computing system 150 can be implemented using two or more server systems 215, as well as computers other than servers, including a server pool. The server system 215 may be any computer or processing device such as, for example, a blade server, general-purpose personal computer (PC), Macintosh, workstation, UNIX-based workstation, or any other suitable device. In other words, the present disclosure contemplates computers other than general-purpose computers, as well as computers without conventional operating systems. Further, the illustrated server system 215 may be adapted to execute any operating system, including Linux, UNIX, Windows, Mac OS, or any other suitable operating system.

In the illustrated embodiment, and as shown in FIG. 2, the server system 215 includes a processor 220, an interface 230, a memory 225, and the influx management model 235. The interface 230 is used by the server system 215 for communicating with other systems in a client-server or other distributed environment (including within computing system 150) connected to the network 210 (e.g., clients 205, as well as other systems communicably coupled to the network 210). Generally, the interface 230 comprises logic encoded in software and/or hardware in a suitable combination and operable to communicate with the network 210. More specifically, the interface 230 may comprise software supporting one or more communication protocols associated with communications such that the network 210 or interface's hardware is operable to communicate physical signals within and outside of the illustrated computing system 150.

Although illustrated as a single processor 220 in FIG. 2, two or more processors may be used according to particular needs, desires, or particular embodiments of computing system 150. Each processor 220 may be a central processing unit (CPU), a blade, an application-specific integrated circuit (ASIC), a field-programmable gate array (FPGA), or another suitable component. Generally, the processor 220 executes instructions and manipulates data to perform the operations of server system 215 and, specifically, the influx management model 235. Specifically, the server's processor 220 executes the functionality required to receive and respond to requests from the clients 205 and their respective client applications, as well as the functionality required to perform the other operations of the influx management model 235.

Regardless of the particular implementation, "software" may include computer-readable instructions, firmware, wired or programmed hardware, or any combination thereof on a tangible medium operable when executed to perform at least the processes and operations described herein. Each software component may be fully or partially written or described in any appropriate computer language including C, C++, C#, Java, Visual Basic, assembler, Perl, any suitable version of 4GL, as well as others. It will be understood that while portions of the software implemented in the context of the embodiments disclosed herein may be shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate. In the illustrated computing system 150, processor 220 executes one or more hosted applications on the server system 215.

At a high level, the influx management model 235 is any application, program, module, process, or other software that may execute, change, delete, generate, or otherwise manage information according to the present disclosure, particularly in response to and in connection with one or more requests received from the illustrated clients 205 and their associated client applications. In certain cases, only one influx management model 235 may be located at a particular server system 215. In others, a plurality of related and/or unrelated modeling systems may be stored at a single server system 215, or located across a plurality of other server systems 215, as well. In certain cases, computing system 150 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications may represent web-based applications accessed and executed by remote clients 205 or client applications via the network 210 (e.g., through the Internet).

Further, while illustrated as internal to server system 215, one or more processes associated with influx management model 235 may be stored, referenced, or executed remotely. For example, a portion of the influx management model 235 may be a web service associated with the application that is remotely called, while another portion of the influx management model 235 may be an interface object or agent bundled for processing at a remote client 205. Moreover, any or all of the influx management model 235 may be a child or sub-module of another software module or enterprise application (not illustrated) without departing from the scope of this disclosure. Still further, portions of the influx management model 235 may be executed by a user working directly at server system 215, as well as remotely at clients 205.

The server system 215 also includes memory 225. Memory 225 may include any memory or database module and may take the form of volatile or non-volatile memory. The illustrated computing system 150 of FIG. 2 also includes one or more clients 205. Each client 205 may be any computing device operable to connect to or communicate with at least the server system 215 and/or via the network 210 using a wireline or wireless connection.

The illustrated data repository 240 may be any database or data store operable to store data, such as data associated with the wellbore 114 and/or the drilling rig 106. Generally, the data may comprise inputs to the influx management model 235, historical and/or operational information associated with the drilling rig 106 or other well systems, and output data from the influx management model 235, as will be disclosed with respect to FIG. 4.

Figure 3:
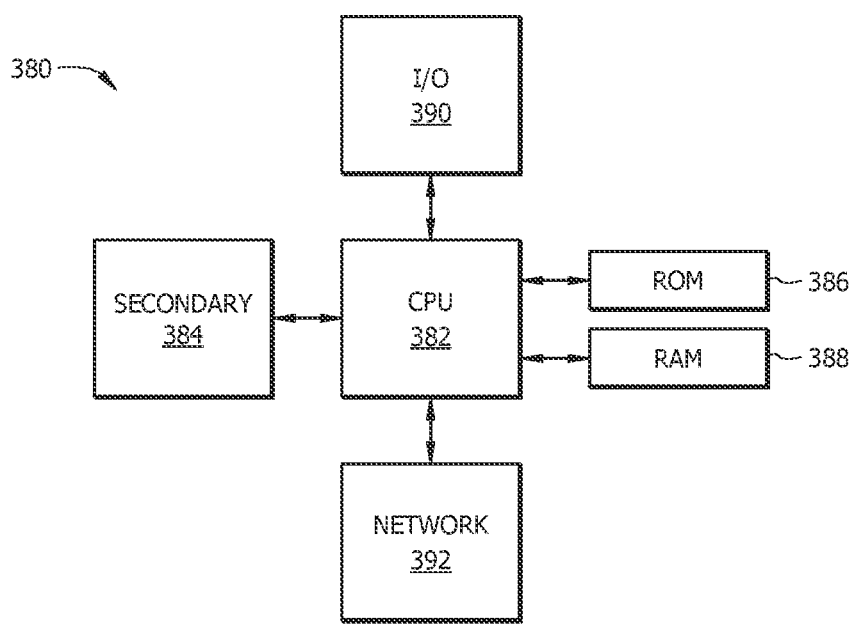
FIG. 3 is a schematic view of an embodiment of a computing system as may be utilized in the context of FIG. 2.

The functionality of one or more of the components disclosed with respect to FIG. 2, such as the server system 215 or the clients 205 can be carried out on a computer or other device comprising a processor (e.g., a desktop computer, a laptop computer, a tablet, a server, a smartphone, or some combination thereof). In addition to the description with respect to FIG. 2, FIG. 3 illustrates a computer system 380 suitable for implementing one or more embodiments disclosed herein such as the server system or any portion thereof that can be used to execute the influx management model 235 or a portion thereof. The computer system 380 includes a processor 382 (which may be referred to as a central processor unit or CPU) that is in communication with memory devices including secondary storage 384, read-only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions of which the application is comprised. In some cases, the CPU 382 may copy the application or portions of the application from memory accessed via the network connectivity devices 392 or via the I/O devices 390 to the RAM 388 or to memory space within the CPU 382, and the CPU 382 may then execute instructions of which the application is comprised. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer-readable storage media and/or non-transitory computer-readable media.

I/O devices 390 may include printers, video monitors, electronic displays (e.g., liquid crystal displays (LCDs), plasma displays, organic light-emitting diode displays (OLED), touch-sensitive displays, etc.), keyboards, keypads, switches, dials, mice, trackballs, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network (e.g., to an event database) in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several known methods. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer-readable storage medium having computer-usable program code embodied therein to implement the functionality disclosed above. The computer program product may comprise data structures, executable instructions, and/or other computer-usable program code. The computer program product may be embodied in removable computer storage media and/or non-removable computer storage media. The removable computer-readable storage medium may comprise, without limitation, a paper tape, a magnetic tape, magnetic disk, an optical disk, a solid-state memory chip, for example, analog magnetic tape, compact disk read-only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer-readable medium or a computer-readable storage media. A dynamic RAM embodiment of the RAM 388, likewise, may be referred to as a non-transitory computer-readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer-readable media or computer-readable storage media.

Figure 4:
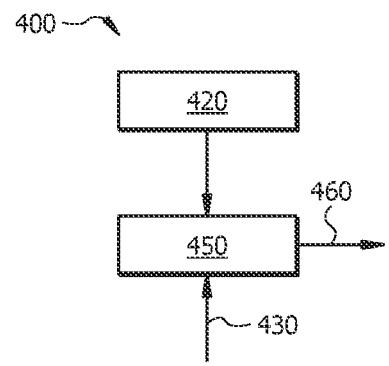
FIG. 4 is a schematic view of an example of the operation of a modeling system as may be utilized in the context of FIG. 2.

FIG. 4 depicts an example of the operation of a modeling system 400, for example, which may be implemented in the context of the influx management model 235 of FIG. 2. In the embodiment of FIG. 4, the modeling system 400 comprises a machine learning module 450 coupled to one or more data stores, for example, data within the data repository 240. For instance, in the embodiment of FIG. 4, the data within the data repository 240 of FIG. 2 may include data from a wellbore influx parameters store 420, and/or inputs 430, as shown and described with reference to FIG. 4. The data within the data repository 240 may also include output 460, as shown and described with reference to FIG. 4.

As also shown in FIG. 4, the machine learning module 450 can access data, such as data from the wellbore influx parameters store 420, receive inputs 430, and provide an output 460 based upon the inputs 430 and data retrieved from the wellbore influx parameters store 420. Generally, the machine learning module 450 utilizes data stored in the wellbore influx parameters store 420 pertaining to an influx within a wellbore that is to be drilled (referred to as the "contemplated wellbore") to enable the machine learning module 450 to predictively characterize an influx and/or determine the effect of an influx encountered in the course of a drilling operation. In various embodiments as will be disclosed herein, the data stored in the wellbore influx parameters store 420 may generally include data about one or more influxes occurring in the contemplated wellbore, data about the wellbore itself, data about the formation in which the wellbore will be drilled, data about the drilling operation, and/or data about the equipment that will be used in the drilling operation such as specifications, capabilities, and/or limitations of the equipment that will be used.

In the course of a drilling operation, as the wellbore is drilled into the formation, the pressure applied to the formation by the drilling fluid within the annular space must be neither to high nor too low. Generally, in conventional drilling operations, the pressure exerted by the drilling fluid at the bottom of the wellbore, referred to as bottom-hole pressure (BHP) is the sum of the hydrostatic pressure of the drilling fluid ($G_a$) and friction losses ($F_a$); that is, $BHP=G_a+F_a$. In a MPD operation, for example, as illustrated with respect to FIG. 1, the choke may be utilized to apply additional pressure to the drilling fluid within the annular space such that the BHP is the sum of $G_a$, $F_a$, and the choke pressure ($C_a$); that is, $BHP=G_a+F_a+C_a$. If the pressure exerted by the drilling fluid is too low, fluids from the formation may flow into the wellbore and, if the pressure exerted by the drilling fluid is too high, drilling fluid may be lost to the formation and/or the formation can be damaged or unintentionally fractured (for example, where the pressure exerted by the drilling fluid exceeds fracture-initiation pressure). When the pressure is not maintained properly, such as operator mistakes, formation fluids can enter the wellbore during the drilling operation, referred to as "influxes" or "fluid influxes." These influxes can be problematic, particularly, in that influxes encountered in a drilling operation (for example, a MPD operation) may subject equipment to conditions exceeding the limitations of that equipment (for example, pressures exceeding RCD pressure limitations). As such, and as will be disclosed herein, improvements in the characterization of an influx and/or the determination of the effect of an influx encountered in the course of a drilling operation may be beneficial in the context of a drilling operation.

In some embodiments, at least a portion of the information in the wellbore influx parameters store 420 can be used to train or develop the machine learning module 450 to predictively characterize and/or determine the effect of an influx. For example, at least a portion of the data stored in the wellbore influx parameters store 420 may be characterized as "training data" that is used to train the machine learning module 450. As will be appreciated by the ordinarily-skilled artisan upon viewing the instant disclosure, although FIG. 4 illustrates an embodiment in which the training data are stored in a single "store" (e.g., at least a portion of the wellbore influx parameters store 420), additionally or alternatively, in some embodiments the training data may stored in multiple stores in one or more locations. Additionally, in some embodiments, the training data (e.g., at least a portion of the data stored in the wellbore influx parameters store 420) may be subdivided into two or more subgroups, for example, a training data subset, one or more evaluation and/or testing data subsets, or combinations thereof.

In various embodiments, the training data may include various types of data such as influx data (e.g., data about an influx occurring in the wellbore), wellbore data (e.g., data about the wellbore itself), formation data (e.g., data about the formation and/or formations that the wellbore will penetrate and fluids within the formation(s)), drilling operation data (e.g., data about contemplated operation by which the wellbore will be drilled), and equipment data (e.g., data about the equipment that will be employed in the drilling operation).

In some embodiments, the training data includes any data associated with an influx in the contemplated wellbore, examples of which can include an initial influx volume, influx intensity and/or "kick" intensity (for example, as indicated by a post-influx surface back-pressure), influx rate, and the like.

Additionally, in some embodiments, the training data includes any data associated with the contemplated wellbore, examples of which can include borehole diameter, wellbore depth, wellbore stages, wellbore stage depths/lengths, wellbore pressures, wellbore temperatures, wellbore flowrates, type of wellbore and/or wellbore inclination, (e.g., vertical, deviated, horizontal, etc.), the completion type (e.g., open hole, cased hole, sand screen, etc.), and the like.

Additionally, in some embodiments, the training data includes any data about the formation or formations that will be penetrated by the contemplated wellbore, examples of which can include any geological and/or petrophysical information associated with the formation(s) such as a porosity, permeability, rock type and distribution (e.g., shale, sandstone, producing layers, non-producing layers, etc.), elemental analysis results, formation fluid saturation levels (e.g., oil saturation, water saturation, gas saturation, etc.), and the like.

Additionally, in some embodiments, the training data may include information about the drilling operation with respect to the contemplated wellbore, including any operating parameters associated with the drilling operation and/or equipment that will be utilized in the drilling operation. For example, in some embodiments, examples of operating parameters can comprise drill string length, drill string inner diameter, drill string outer diameter, annular space diameter, RIH ("run in hole") running speed, POOH ("pull out of hole") running speed, sampling rates, fluid flow rates, operating times, operating costs, and the like. The operating parameters can comprise fluid characteristics, which can include information about the fluids utilized and characteristics thereof such as fluid type (e.g., aqueous, oil-base, emulsion), fluid viscosity, fluid density, fluid additives, pressures inside and out of the tool string and within the well at the surface and (if available) downhole, temperatures at different portions along the length of the well and other information. In some embodiments, some of these characteristics may be static, for example, representing data that is fixed across the duration of the drilling operation or at least a portion of the operation. The fluid characteristics can also include dynamic characteristics such as flow rate, pressures inside and out tool string and within the well, and other information.

Additionally, in some embodiments, the training data may include information related to the equipment that will be utilized in the drilling operation, examples of which may include identifier and/or specifications for each equipment component, for example, manufacturer, model number, size, pressure rating, power rating, operating characteristics (e.g., voltage, flow rates, sensing capacities, a maximum flow/injection rate/profile, etc.). For example, the data stored within the wellbore influx parameters store 420 can include a database of tools or other components that could be used in the drilling operation, for example, identified by manufacturer, model number, size and pressure rating, correlated to their characteristics. The equipment can comprise any tools or other components used in a wellbore, including any of the tools described herein (e.g., with respect to FIG. 1 and FIG. 2, as well as any sensors, pumps, isolation devices such as packers, plugs, conduits, or the like.

Because the particular wellbore for which the machine learning module 450 is trained is yet-to-be-drilled at the time the machine learning module 450 is trained, in some embodiments, some or all of the data used to train the machine learning module 450, for example, the training data and/or the data stored in the wellbore influx parameters store 420, may be simulated or artificial data. Thus, the data in the wellbore influx parameters store 420 can be data that is representative of the actual data that may be encountered in the drilling operation, although in some embodiments, the training data may be supplemented with actual data, such as data produced in the course of the drilling operation to further train, tune, or optimize the machine learning module 450. In some embodiments, additional information pertinent or related to the wellbore, the formation, the drilling operation, and/or the equipment (for example, operational costs, wellbore/formation costs or profits, equipment maintenance, equipment scheduling, etc.) can also be included and stored within the wellbore influx parameters store 420.

Generally, the training data, for example, the data stored in the wellbore influx parameters store 420, may be generated by any suitable model. In some embodiments, a suitable model may be a multi-phase model that is configured to account for the possibility of multiple phases when the influx happens (e.g., a liquidous phase, a gaseous phase, or a mixture of liquidous and gaseous phases), as opposed to models, such as the "single-bubble" approach, which uses a simplified analytical solution and considers the gas migration in the annulus as a "single bubble." Not intending to be bound by theory, by accounting for the possibility of multiple phases of the influx, a multi-phase model may exhibit greater accuracy than models presuming only a single phase.

In various embodiments, a suitable model may be characterized as a transient two-phase model or a drift-flux model (DFM). In the DFM, mass conservation of the gaseous and liquidous phases is taken into account separately, and the interactions between the two phases are accounted for. An example of a suitable model that may be used to generate the training data, for example, the data stored in the wellbore influx parameters store 420 includes various commercial software. However, use of commercial software to generate database for training will take extreme time which makes it inapplicable for use during the operation.

In some embodiments, software developed based upon the multi-phase model or DFM can simulate various scenarios in the course of the drilling operation with respect to the contemplated well and generate various data for each scenario, for example, a batch of data representing each of a desired combination of parameters for each scenario. The range of the operational parameters may be determined during a well planning phase, and software can automatically discretize or mesh the well depth and flow rate, possible influx volume and post influx surface backpressure etc. and generate input data sets to feed the multi-phase model for batch simulation. Taken together, these batches of data representing each of a desired combination of parameters for each scenario form the training data, for example, the data stored in the wellbore influx parameters store 420.

As also shown in the embodiment of FIG. 4, the machine learning module 450 can receive one or more inputs 430. Generally, the inputs 430 can comprise one or more constraints or limitations that may affect the way in which the machine learning module 450 is trained. In various embodiments, the inputs 430 can be provided as separate inputs, as a single input, or as a vector or matrix of input values. In some embodiments, the inputs 430 may be received, for example, from an equipment operator or other user.

In various embodiments, the inputs 430 may define, for instance, constraints or parameters for the machine learning module 450. For example, the inputs 430 may be a safety threshold that cannot be exceeds, an indication of acceptable or unacceptable risk tolerances, or some other limitation. Based on the inputs 430, the machine learning module 450 may use the data stored in the wellbore influx parameters store 420 to develop an influx management model, such as the influx management model 235 of FIG. 2, while accounting for the constraints.

Generally, the machine learning module 450 is a learning machine exhibiting "artificial intelligence" capabilities. For example, the machine learning module 450 may utilize algorithms to learn via inductive inference based on observing data that represents incomplete information about statistical phenomenon and generalizes it to rules and to make predictions on missing attributes or future data. Further, the machine learning module 450 may perform pattern recognition, in which the machine learning module 450 "learns" to automatically recognize complex patterns, to distinguish between exemplars based upon varying patterns, and to make intelligent predictions. In some embodiments, the machine learning module 450 can include or be accompanied by an optimization algorithm, like genetic algorithm (GA), ant colony optimization algorithm (ACO), Simulated Annealing (SA), etc. to increase the model accuracy and narrow down the data used to allow the machine learning module 450 to operate efficiently, even when large amounts of historical training data are present, and/or when complex input parameters are present.

The machine learning module 450 can comprise and/or implement any suitable machine learning algorithm or methodology, examples of which may include, but are not limited to, artificial neural networks (ANNs), deep neural networks (DNNs), deep reinforcement learning, convolutional neural networks, decision trees, support vector machines, Bayesian networks, optimization algorithms, and the like, and combinations thereof.

At a high level, the machine learning module 450 may receive inputs 430 comprising constraints and parameters for the drilling operation and training data, for example, data from the wellbore influx parameters store 420 to perform learning with respect to characterization of one or more influxes encountered during the drilling operation. For example, in some embodiments, the machine learning module 450 may "learn" or be trained by processing the training data, more particularly, the data from the wellbore influx parameters store 420, which includes a plurality of batches of data, each batch representing each of a data for each of a plurality of scenarios. Each batch of data may include known inputs (e.g., the various wellbore influx parameters disclosed herein) and known outcome(s), for example, a characterization of the influx generated in a particular scenario (e.g., the influx volume), As the machine learning module 450 processes the training data, the machine learning module 450 may form one or more probability-weighted associations between the various known inputs and the respective outcomes. As training progresses, the machine learning module 450 may adjust weighted associations between various inputs, for example, according to a learning rule, in order to decrease the error between the inputs and their respective outputs. As such, the machine learning module 450 may increasingly approach target output(s) until the error is acceptable.

Figure 5:
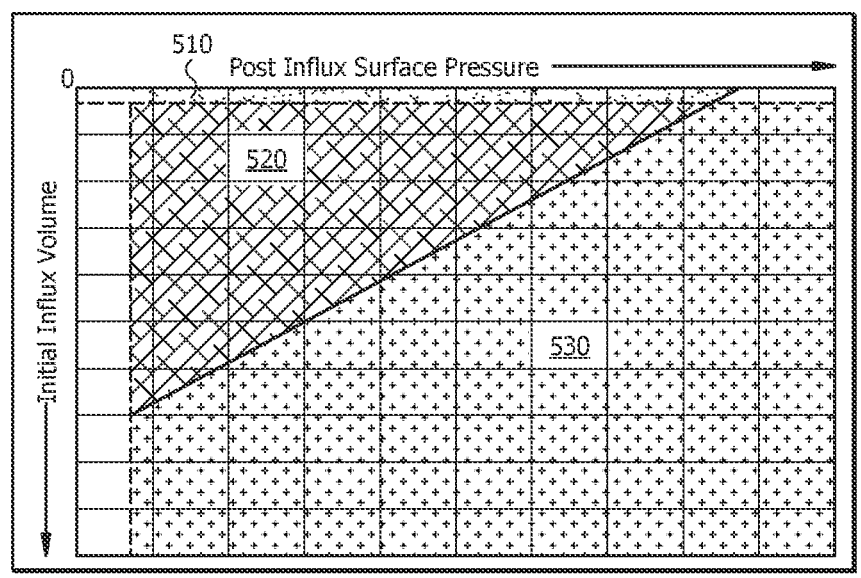
FIG. 5 is an embodiment of an influx management envelope tool.

As such, in some embodiments, based on processing the training data, for example, data from the wellbore influx parameters store 420, the machine learning module 450 may provide, as an output 360, a characterization of an influx encountered in the course of a drilling operation with respect to a contemplated wellbore. That is, once the machine learning module 450 has been trained using the training data (for example, simulated data from the wellbore influx parameters store 420), the machine learning module 450 may be used during the actual drilling operation (that is, the drilling operation as carried out with respect to the contemplated wellbore) to characterize the volume of an influx encountered in the course of the drilling operation. In some embodiments, when implemented during the actual drilling operation, the machine learning module 450 may produce an IME tool based upon the characterization of the influx volume. An example of an IME 500 tool is illustrated in FIG. 5. The IME 500 illustrates influx intensity, as post-influx surface pressure, along the x-axis and initial influx volume (e.g., within the wellbore) along the y-axis. Generally, the IME 500 includes three regions: a normal-operations region 510, a primary barrier influx circulation region 520, and a secondary barrier influx region 530. The use of the IME tool is discussed in the context of a wellbore drilling method, as follows. The normal-operations region 510, also referred to as a "green region," generally identifies normal MPD operations, for example, where no influx has been detected in the wellbore, surface pressures are within the contemplated parameters, and the MPD operation is able to proceed as planned. The primary barrier influx circulation region 520, also referred to a "yellow region," generally identifies an operational region where an influx has been detected within the wellbore and the influx can be circulated safely to surface using primary wellbore barriers without exceeding the operational limitations of the equipment. The secondary barrier influx region 530, also referred to as a "red region," generally defines an operational region in which an influx has been detected but the conditions indicates that one or more limits of the primary barrier would be exceeded and that the well should be secured with a secondary barrier. Generally, a primary barrier refers to a first enclosure that prevents flow of a fluid from a particular source and a secondary barrier refers to a second enclosure that also prevents flow the fluid from the source, for example, as a back-up to the primary barrier and that is not, under normal conditions, in use.

In one or more of the embodiments disclosed herein, the influx management model 235 has been disclosed with respect to a single, individual well. For example, in one or more of the embodiments disclosed herein, the influx management model 235 may have been previously untrained (e.g., with data from another well) and/or previously unused (e.g., in a prior drilling operation). Additionally or alternatively, in some embodiments, the influx management model 235 may be trained using data from one or more databases, for example, each database pertaining to different wells. For example, simulated pertaining to different wellbores can be combined and expanded to train the machine learning model. In some embodiments, the machine learning model can be updated and/or retrained with a second newer database once it is updated. In such embodiments, and not intending to be bound by theory, the machine learning model may learn multiple new scenarios and improve its predictions to cover a wide range of drilling and/or wellbore scenarios.

A method for drilling a wellbore (wellbore 114 of FIG. 1) may utilize an influx management model, for example, influx management model 235 disclosed with respect to FIG. 2 (an example, of which is the machine learning module 450 disclosed with respect to FIG. 4). Generally such a method for drilling a wellbore includes a planning phase and an implementation phase.

Figure 6:
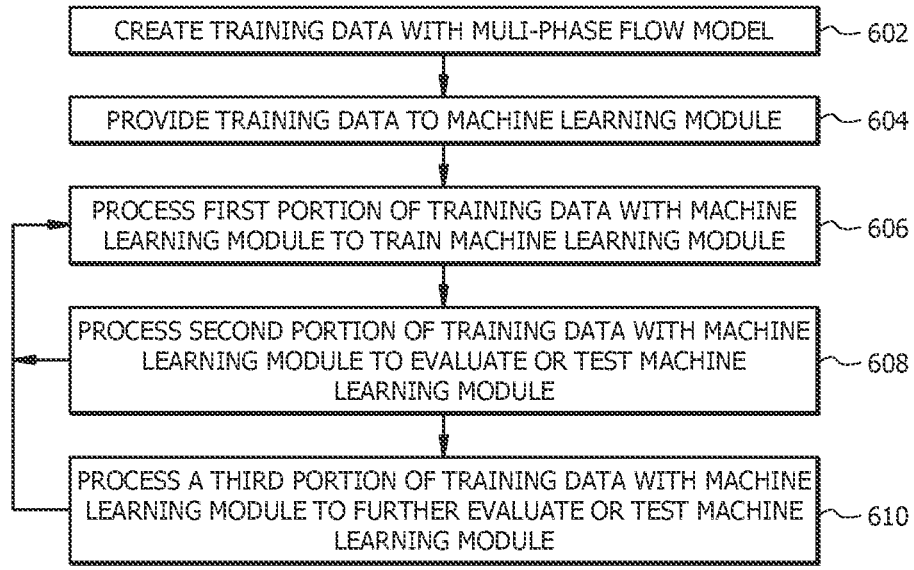
FIG. 6 is a schematic view of an embodiment of an influx management model development method using machine learning.

Generally, the planning phase may include a method for developing the influx management model. Referring to FIG. 6, an example, of an influx management model development method 600 is illustrated schematically. In some embodiments, the influx management model development method 600 may be characterized as a method for training the influx management model, using the data in the wellbore influx parameters store 420, to train the influx management model. The training method may yield a trained influx management model that, when implemented in the context of a drilling operation, is able to characterize an influx encountered during the drilling operation, for example, by determining the volume, upon reaching the surface, of the influx (referred to as a "surface volume" or "volume at surface").

In the embodiment of FIG. 6, at step 602, a data base comprising training data is created. For example, as disclosed herein with respect to the training data (e.g., the data stored in the wellbore influx parameters store 420 of FIG. 4), the training data and/or the data stored in the wellbore influx parameters store 420, may be simulated or artificial data. In some embodiments, the training data may be generated by multi-phase model, for example a transient two-phase model or a DFM. For example, the multi-phase model can simulate various scenarios in the course of the drilling operation and generate a plurality of batches of data, each batch representing a desired combination of parameters for each scenario. The various batches of data, for example, at least a portion of which may form the training data, may be used to populate the database, for example, stored in the wellbore influx parameters store 420. In some embodiments, some of the parameters may be varied to generate the various batches of data, while one or more parameters may be held constant according to the planned drilling operation. For example, it may be unnecessary to generate data representative of equipment that will not be used, fluid characteristics outside the scope of the fluids that will be used, or the like. Not intending to be bound by theory, by limiting the variation of one or more of the parameters, the training data can be limited to scenarios that will have the most relevance with respect to the contemplated wellbore and drilling operation.

In some embodiments, and as noted above, the entirety of the training data generated by the multi-phase model, for example, the plurality of batches of data, may be grouped (e.g., randomly) into various subgroups, for example a training data subset, one or more evaluation and/or testing data subset, or combinations thereof.

At step 604, at least a portion of the training data (for example, the training data subset) is provided to a machine learning module (for example, the machine learning module 450 of FIG. 4) for the purpose of training the machine learning module. At step 606, at least a portion of the training data (for example, the training data subset) is processed by the machine learning module such that the machine learning module becomes trained to characterize an influx encountered in the course of a drilling operation with respect to a contemplated wellbore, more particularly, to determine the volume, upon reaching the surface, of the influx.

In some embodiments, may undergo one or more validation, evaluation, and/or or testing protocols to determine whether or not the trained machine learning module is able to appropriate characterize an influx. For example, as illustrated at step 608 in FIG. 6, the trained machine learning module is evaluated and/or tested using at least a portion of the training data (for example, a first evaluation and/or testing data subset). For example, during the evaluation procedure, the trained machine learning module may process the first evaluation and/or data subset to predict influx volume, upon reaching the surface, and the results of the evaluation may be compared to an acceptable error threshold (e.g., an error of less than about 5%, or an error value of less than about 4%, or an error value of less than about 3%, or an error value of less than about 2%, or an error value of less than about 1%, or an error value of less than about 0.5%, or an error value of less than about 0.1%, or an error value of less than about 0.05%, or an error value of less than about 0.01%, etc., as suitable). If the error exhibited by the trained machine learning module is not acceptable, the machine learning module may be retrained, returning to step 606. In some embodiments, optionally, if additional training and/or retraining is necessary, additional or alternative training data may be used in the training process, for example, by simulating new or additional training data or regrouping the existing training data.

If the error exhibited by the trained machine learning algorithm is acceptable, in some embodiments, the machine learning module may be subjected to an additional evaluation and/or testing protocol, for example, to verify that the trained machine learning module is able to appropriately characterize an influx. For example, as illustrated at step 610 in FIG. 6, the trained machine learning module is reevaluated and/or retested using at least a portion of the training data (for example, a second evaluation and/or testing data subset). As similarly disclosed with respect to step 608, the trained machine learning module may process a second evaluation and/or data subset to predict influx volume, upon reaching the surface, and the results of the reevaluation and/or retesting may be compared to an acceptable error threshold. Again, if the error exhibited by the trained machine learning module is not acceptable, the machine learning module may be retrained, returning to step 606.

In various embodiment, the trained, and optionally retrained, machine learning module may be subjected to any desired number of evaluation, testing, and or verification stages. When the error exhibited by the trained machine learning module is acceptable error across the desired number of evaluation, testing, and or verification stages, the influx management model may be considered ready for use, at step 610, in the implementation phase of the drilling, for example, as will be disclosed with respect to FIG. 7.

Figure 7:
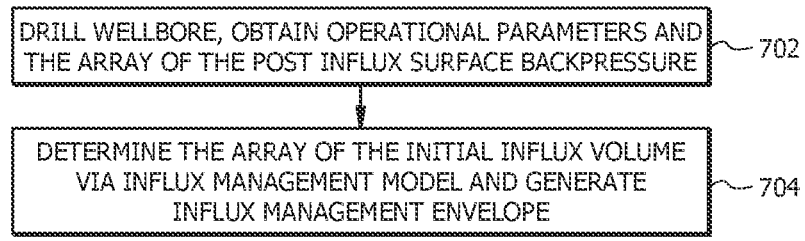
FIG. 7 is a schematic view of an embodiment of an influx management method.

Once the influx management model is developed, for example, where the machine learning module has been trained and, optionally, evaluated, tested and/or verified in one or more iterations, the influx management model can be used in the implementation phase of the method for drilling the wellbore. Generally, the implementation phase may include a method for managing influxes encountered during a wellbore drilling operation. Referring to FIG. 7, an influx management method 700 is illustrated schematically. As disclosed with respect to FIG. 7, the influx management method 700 may utilize the influx management model (for example, the influx management model 235 of FIG. 2) to accurately determine the volume, upon reaching the surface, of the influx.

In the embodiment of FIG. 7, the influx management method 700 comprises, at step 702, drilling a wellbore, for example, according to the parameters used to develop the influx management model. In some embodiments, drilling the wellbore may comprise circulating a drilling fluid through the wellbore while the drill bit is operated to effectuate boring of the wellbore. For example, as disclosed in the context of FIG. 1, the drilling fluid may be pumped, via the operation of the rig pump 130, downward through the axial flowbore 124 of the drill string and returned toward the surface 104 via the annular space 126 between the drill string 120 and the sidewalls of the wellbore 114 which may be defined by the casing string 112 and/or the subterranean formation 102. In some embodiments, drilling the wellbore may also comprise controlling the pressure of the drilling fluid within the annular space 126. For example, and as also disclosed with respect to FIG. 1, the RCD 134 collects the returned drilling fluid and directs the drilling fluid to the drilling fluid choke, which may be operated to control the pressure of the drilling fluid within the annular space 126. In some embodiments, drilling the wellbore may also comprise obtaining and/or monitoring one or more operational parameters associated with the drilling operation for indication of an influx within the wellbore. For example, in the context of FIG. 1, the pressure and/or flow rate of the drilling fluid returned via the annular space 126 may be monitored for indicia of an influx within the wellbore 114, for example, in a lower or lower-most portion of the wellbore 114. For example, a differential between the volume of drilling fluid being pumped into the wellbore and the volume of drilling fluid being returned from the wellbore may indicate an influx within the wellbore. For example, where the volume being returned is greater than the volume being pumped into the wellbore, the difference may be indicative of the initial influx volume (e.g., downhole). Additionally, a sudden increase or spike in the pressure of the drilling fluid may also indicate an influx.

When an influx is identified, the influx management method 700 comprises, at step 704, using the current operational parameters and boundary conditions, such as well depth, flow rate, post influx surface back pressure (kick intensity), MPD system pressure limit (as maximum surface backpressure during influx circulation) etc., to determine the corresponding influx volume via the operation of the influx management model (e.g., influx management model 235). More particularly, if an array of post influx surface backpressure is fed to the influx management model, an array of influx volumes will be calculated or determined by the influx management model. The MPD system pressure limit (e.g. RCD pressure limit) may be used as the maximum surface back pressure input of the influx management model and, thus, the sets of post influx surface backpressure and influx volume represent the points on the influx management envelope. Therefore, the array of post influx surface backpressures (kick intensities) and the corresponding array of influx volumes can be used to generate the influx management envelope (shown as an example in FIG. 5), and the IME may be presented to a user to enable the user to make operational decisions with respect to the influx and the drilling operation. For example, the influx management model 235 may produce or output data sufficient to produce an IME, for example, as illustrated and discussed with respect to FIG. 5.

The IME, for example, IME 500 of FIG. 5, can be used to manage the influx encountered in a wellbore drilling operation. For example, in practice, a user may refer to the IME 500 generated by the influx management model to determine the best course of action for dealing with an influx that has been detected. If the IME 500 indicates that operational conditions are within the primary barrier influx circulation region 520 (the "yellow region"), the influx can be circulated to surface using primary wellbore barriers without exceeding the operational limitations of the equipment. Alternatively, where the IME 500 indicates that one or more limits of the primary barrier would be exceeded, a secondary barrier may be used to ensure that equipment limitations (for example, pressure limitations of the RCD and/or flow-rate limitations of various surface equipment) are not exceeded in attempting to circulate out the influx.

An influx management model (e.g., influx management model 235) may be advantageously employed in the context of a drilling operation, particularly, a MPD operation. For instance, because the influx management model 235 relies upon training data generated by a multi-phase model and thus accounts for variations due to phase variations, yields results exhibiting improved accuracy with respect to models that fail to account for such variations (e.g., a single-bubble approach). Additionally, although multi-phase models may exist, such models require significant computational time, precluding their implementation in drilling operation. By utilizing a multi-phase model to train the influx management model and, then, implementing the trained influx management model real-world drilling operations, the systems and methods disclosed herein achieve higher accuracy and, at the same time, perform with sufficient efficiency to enable results to be obtained in a real-time manner.

The improved accuracy of the disclosed influx management model can improve safety, for example, by lessening the possibility that an influx might cause damage to equipment where it was believed that the influx would not pose any significant risk. At the same time, the improved accuracy can lessen downtime, for example, by lessening the possibility that a drilling operation be ceased and secondary barriers employed as a result of an influx that might have been believed problematic but, in actuality, was not.

ADDITIONAL EMBODIMENTS

The disclosure having been generally described, the following examples are given as particular embodiments of the disclosure and to demonstrate the practice and advantages thereof. It is understood that the examples are given by way of illustration and are not intended to limit the specification or the claims in any manner.

A first embodiment is a method of managing an influx encountered during a drilling operation conducted with respect to a wellbore, the method comprising drilling a wellbore into a subterranean formation, wherein drilling the wellbore comprises circulating a drilling fluid through a wellbore while operating a drill bit and monitoring one or more parameters associated with the drilling operation for indicia of the influx within the wellbore. The method also comprises, upon detecting the indicia of the influx, determining, via an influx management model, an initial influx volume.

A second embodiment is the method of the first embodiment, wherein the drilling operation is a managed pressure drilling operation, and wherein the drilling fluid is circulated into the wellbore via a flowbore of a drill string and out of the wellbore via an annular space between the drill string a wellbore sidewall, the method further comprising controlling a pressure of the drilling fluid within the annular space.

A third embodiment is the method of one of the first through the second embodiments, wherein the indicia of the influx comprises an increase in surface backpressure, an increase in a volume of the drilling fluid being returned from the wellbore relative to a volume of drilling fluid being pumped into the wellbore, or combinations thereof.

A fourth embodiment is the method of the third embodiment, wherein the influx management model comprises a machine learning module, wherein the machine learning module implements a machine learning methodology comprising artificial neural networks, deep neural networks, deep reinforcement learning, convolutional neural networks, decision trees, support vector machines, Bayesian networks, genetic algorithms, or combinations thereof.

A fifth embodiment is the method of the fourth embodiment, wherein the influx management model is trained using simulated training data.

A sixth embodiment is the method of the fifth embodiment, wherein the simulated training data was generated via a multi-phase flow model.

A seventh embodiment is the method of one of the fifth through the sixth embodiments, wherein the simulated training data includes a plurality of parameters pertaining to the influx, the wellbore, the drilling operation, the subterranean formation, or combinations thereof.

An eighth embodiment is the method of one of the fifth through the seventh embodiments, wherein the simulated training data includes an initial influx volume, a post-influx surface backpressure.

A ninth embodiment is the method of one of the first through the eighth embodiments, wherein determining, via the influx management model, the initial influx volume comprises producing an influx management envelope tool.

A tenth embodiment is the method of the ninth embodiment, further comprising circulating the influx out of the wellbore where the influx management envelope tool indicates that the influx will not expose equipment to pressure exceeding an operational limit of that equipment and utilizing a secondary barrier the influx out of the wellbore where the influx management envelope tool indicates that the influx will expose equipment to pressure exceeding the operational limit of that equipment.

An eleventh embodiment is a system for managing an influx during a drilling operation, the system comprising a drilling rig configured to drill a wellbore into a subterranean formation by circulating a drilling fluid through a wellbore while operating a drill bit and monitoring one or more parameters associated with the drilling operation for indicia of the influx within the wellbore. The system also comprises an influx management model configured to, upon detecting the indicia of the influx, determine the initial influx volume.

A twelfth embodiment is the system of the eleventh embodiment, wherein the drilling operation is a managed pressure drilling operation, wherein the drilling fluid is circulated into the wellbore via a flowbore of a drill string and out of the wellbore via an annular space between the drill string a wellbore sidewall, and wherein drilling rig is further configured to control a pressure of the drilling fluid within the annular space.

A thirteenth embodiment is the system of one of the eleventh through the twelfth embodiments, wherein the influx management model comprises a machine learning module that is trained using simulated training data, wherein the machine learning module is configured to implement a machine learning methodology comprising artificial neural networks, deep neural networks, deep reinforcement learning, convolutional neural networks, decision trees, support vector machines, Bayesian networks, genetic algorithms, or combinations thereof.

A fourteenth embodiment is the system of the thirteenth embodiment, wherein the simulated training data was generated via a multi-phase flow model.

A fifteenth embodiment is the system of one of the thirteenth through the fourteenth embodiments, wherein the simulated training data includes a plurality of parameters pertaining to the influx, the wellbore, the drilling operation, the subterranean formation, or combinations thereof.

A sixteenth embodiment is the system of one of the fifteenth embodiments, wherein the simulated training data includes an initial influx volume, a post-influx surface backpressure.

A seventeenth embodiment is the method of training an influx management model, the method comprising creating, via a multi-phase flow model, simulated training data with respect to a first wellbore and processing, via a machine learning module, at least a first portion of the simulated training data to train the machine learning module, wherein, when trained, the influx management model is configured to, upon detecting indicia of an influx within the wellbore, determine an initial influx volume.

An eighteenth embodiment is the method of the seventeenth embodiment, wherein the simulated training data includes a plurality of parameters pertaining to the influx, the wellbore, a drilling operation to drill the wellbore, a subterranean formation penetrated by the wellbore, or combinations thereof.

A nineteenth embodiment is the method of the seventeenth embodiments, wherein the simulated training data includes an initial influx volume, a post-influx surface backpressure, or combinations thereof.

A twentieth embodiment is the method of one of the seventeenth through the eighteenth embodiments, further comprising processing at least a second portion of the simulated training data to evaluate or test the machine learning module.

A twenty-first embodiment is the method of one of the seventeenth through the twentieth embodiments, wherein the machine learning module is configured to implement a machine learning methodology, wherein the machine learning methodology comprises artificial neural networks, deep neural networks, deep reinforcement learning, convolutional neural networks, decision trees, support vector machines, Bayesian networks, optimization algorithms, or combinations thereof.

A twenty-second embodiment is the method of one of the seventeenth through the twenty-first embodiments, further comprising updating the influx management model, wherein updating the influx management model comprises creating, via the multi-phase flow model, simulated training data with respect to a second wellbore and processing, via the machine learning module, at least a first portion of the simulated training data with respect to the second wellbore to update the machine learning module.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of managing an influx encountered during a drilling operation conducted with respect to a wellbore, wherein the drilling operation is a managed pressure drilling operation, the method comprising:
   drilling the wellbore into a subterranean formation, wherein drilling the wellbore comprises:
      circulating a drilling fluid through a wellbore while operating a drill bit, wherein the drilling fluid is circulated into the wellbore via a flowbore of a drill string and out of the wellbore via an annular space between the drill string a wellbore sidewall; and
      monitoring one or more parameters associated with the drilling operation for indicia of the influx within the wellbore;
   upon detecting the indicia of the influx, determining, via an influx management model, an initial influx volume; and
   controlling a pressure of the drilling fluid within the annular space.

2. The method of claim 1, wherein the indicia of the influx comprises an increase in surface backpressure, an increase in a volume of the drilling fluid being returned from the wellbore relative to a volume of drilling fluid being pumped into the wellbore, or combinations thereof.

3. The method of claim 2, wherein the influx management model comprises a machine learning module, wherein the machine learning module implements a machine learning methodology comprising artificial neural networks, deep neural networks, deep reinforcement learning, convolutional neural networks, decision trees, support vector machines, Bayesian networks, genetic algorithms, or combinations thereof.

4. The method of claim 3, wherein the influx management model is trained using simulated training data.

5. The method of claim 4, wherein the simulated training data was generated via a multi-phase flow model.

6. The method of claim 4, wherein the simulated training data includes a plurality of parameters pertaining to the influx, the wellbore, the drilling operation, the subterranean formation, or combinations thereof.

7. The method of claim 6, wherein the simulated training data includes an initial influx volume, a post-influx surface backpressure.

8. The method of claim 1, wherein determining, via the influx management model, the initial influx volume comprises producing an influx management envelope tool.

9. The method of claim 8, further comprising:
   circulating the influx out of the wellbore where the influx management envelope tool indicates that the influx will not expose equipment to pressure exceeding an operational limit of that equipment; and
   utilizing a secondary barrier to circulate the influx out of the wellbore where the influx management envelope tool indicates that the influx will expose equipment to pressure exceeding the operational limit of that equipment.

10. A system for managing an influx during a drilling operation, wherein the drilling operation is a managed pressure drilling operation, the system comprising:
   a drilling rig configured to drill a wellbore into a subterranean formation by:
      circulating a drilling fluid through a wellbore while operating a drill bit, wherein the drilling fluid is circulated into the wellbore via a flowbore of a drill string and out of the wellbore via an annular space between the drill string a wellbore sidewall, wherein the drilling rig is configured to control a pressure of the drilling fluid within the annular space;

monitoring one or more parameters associated with the drilling operation for indicia of the influx within the wellbore;

an influx management model configured to, upon detecting the indicia of the influx, determine an initial influx volume.

11. The system of claim 10, wherein the influx management model comprises a machine learning module that is trained using simulated training data, wherein the machine learning module is configured to implement a machine learning methodology comprising artificial neural networks, deep neural networks, deep reinforcement learning, convolutional neural networks, decision trees, support vector machines, Bayesian networks, genetic algorithms, or combinations thereof.

12. The system of claim 11, wherein the simulated training data was generated via a multi-phase flow model.

13. The system of claim 11, wherein the simulated training data includes a plurality of parameters pertaining to the influx, the wellbore, the drilling operation, the subterranean formation, or combinations thereof.

14. The system of claim 13, wherein the simulated training data includes an initial influx volume, a post-influx surface backpressure.

15. A method of managing an influx encountered during a drilling operation conducted with respect to a wellbore, the method comprising:

drilling the wellbore into a subterranean formation, wherein drilling the wellbore comprises:
circulating a drilling fluid through a wellbore while operating a drill bit; and
monitoring one or more parameters associated with the drilling operation for indicia of the influx within the wellbore;

upon detecting the indicia of the influx, determining, via an influx management model, an initial influx volume, wherein the influx management model comprises a machine learning module, wherein the machine learning module implements a machine learning methodology comprising artificial neural networks, deep neural networks, deep reinforcement learning, convolutional neural networks, decision trees, support vector machines, Bayesian networks, genetic algorithms, or combinations thereof, and wherein the indicia of the influx comprises an increase in surface backpressure, an increase in a volume of the drilling fluid being returned from the wellbore relative to a volume of drilling fluid being pumped into the wellbore, or combinations thereof.

16. The method of claim 15, wherein the influx management model is trained using simulated training data.

17. The method of claim 16, wherein the simulated training data was generated via a multi-phase flow model.

18. The method of claim 16, wherein the simulated training data includes a plurality of parameters pertaining to the influx, the wellbore, the drilling operation, the subterranean formation, or combinations thereof.

19. The method of claim 18, wherein the simulated training data includes an initial influx volume, a post-influx surface backpressure.

20. The method of claim 15, wherein determining, via the influx management model, the initial influx volume comprises producing an influx management envelope tool.

21. The method of claim 20, further comprising:
circulating the influx out of the wellbore where the influx management envelope tool indicates that the influx will not expose equipment to pressure exceeding an operational limit of that equipment; and
utilizing a secondary barrier to circulate the influx out of the wellbore where the influx management envelope tool indicates that the influx will expose equipment to pressure exceeding the operational limit of that equipment.

22. A method of managing an influx encountered during a drilling operation conducted with respect to a wellbore, the method comprising:

drilling the wellbore into a subterranean formation, wherein drilling the wellbore comprises:
circulating a drilling fluid through a wellbore while operating a drill bit; and
monitoring one or more parameters associated with the drilling operation for indicia of the influx within the wellbore;

upon detecting the indicia of the influx, determining, via an influx management model, an initial influx volume, wherein determining, via the influx management model, the initial influx volume comprises producing an influx management envelope tool;

circulating the influx out of the wellbore where the influx management envelope tool indicates that the influx will not expose equipment to pressure exceeding an operational limit of that equipment; and utilizing a secondary barrier to circulate the influx out of the wellbore where the influx management envelope tool indicates that the influx will expose equipment to pressure exceeding the operational limit of that equipment.

23. The method of claim 22, wherein the indicia of the influx comprises an increase in surface backpressure, an increase in a volume of the drilling fluid being returned from the wellbore relative to a volume of drilling fluid being pumped into the wellbore, or combinations thereof.

24. The method of claim 22, wherein the influx management model comprises a machine learning module, wherein the machine learning module implements a machine learning methodology comprising artificial neural networks, deep neural networks, deep reinforcement learning, convolutional neural networks, decision trees, support vector machines, Bayesian networks, genetic algorithms, or combinations thereof.

25. The method of claim 24, wherein the influx management model is trained using simulated training data.

26. The method of claim 25, wherein the simulated training data was generated via a multi-phase flow model.

27. The method of claim 25, wherein the simulated training data includes a plurality of parameters pertaining to the influx, the wellbore, the drilling operation, the subterranean formation, or combinations thereof.

28. The method of claim 25, wherein the simulated training data includes an initial influx volume, a post-influx surface backpressure.

29. A system for managing an influx during a drilling operation, the system comprising:
a drilling rig configured to drill a wellbore into a subterranean formation by:
circulating a drilling fluid through a wellbore while operating a drill bit; and monitoring one or more parameters associated with the drilling operation for indicia of the influx within the wellbore;

an influx management model configured to, upon detecting the indicia of the influx, determine an initial influx volume, wherein the influx management model comprises a machine learning module that is trained using simulated training data, wherein the machine learning module is configured to implement a machine learning methodology comprising artificial neural networks, deep neural networks, deep reinforcement learning, convolutional neural networks, decision trees, support vector machines, Bayesian networks, genetic algorithms, or combinations thereof.

30. The system of claim 29, wherein the simulated training data was generated via a multi-phase flow model.

31. The system of claim 29, wherein the simulated training data includes a plurality of parameters pertaining to the influx, the wellbore, the drilling operation, the subterranean formation, or combinations thereof.

32. The system of claim 31, wherein the simulated training data includes an initial influx volume, a post-influx surface backpressure.

\* \* \* \* \*